United States Patent [19]

Kreitzer

[11] 4,359,272
[45] Nov. 16, 1982

[54] INTERNAL FOCUSING TELEPHOTO LENS
[75] Inventor: Melvyn H. Kreitzer, Cincinnati, Ohio
[73] Assignee: Balcon Industries, Inc., Brookfield, Wis.
[21] Appl. No.: 183,999
[22] Filed: Sep. 4, 1980

Related U.S. Application Data

[63] Continuation-in-part of Ser. No. 941,515, Sep. 11, 1978, abandoned.

[51] Int. Cl.³ .................. G02B 9/60; G02B 13/02
[52] U.S. Cl. ................................................. 350/455
[58] Field of Search .................. 350/455, 456, 454

[56] References Cited

U.S. PATENT DOCUMENTS

| | | | |
|---|---|---|---|
| 3,597,048 | 8/1971 | Bertele | 350/423 |
| 3,854,797 | 12/1974 | Yokota | 350/455 X |
| 3,883,229 | 5/1975 | Determann et al. | 350/455 X |
| 4,037,935 | 7/1977 | Momiyama | 350/455 |
| 4,126,378 | 11/1978 | Ogino | 350/455 X |

*Primary Examiner*—John K. Corbin
*Assistant Examiner*—Scott J. Sugarman
*Attorney, Agent, or Firm*—Andrus, Sceales, Starke & Sawall

[57] ABSTRACT

A new and improved telephoto lens comprising a stationary front positive group, a movable second group employed for internal focusing, a stationary third positive group and a stationary fourth negative group. The lens has a very low telephoto ratio and a very short focusing motion accompanied by a high degree of aberrational correction, all of which is achieved without the use of crystalline or expensive glass materials.

11 Claims, 23 Drawing Figures

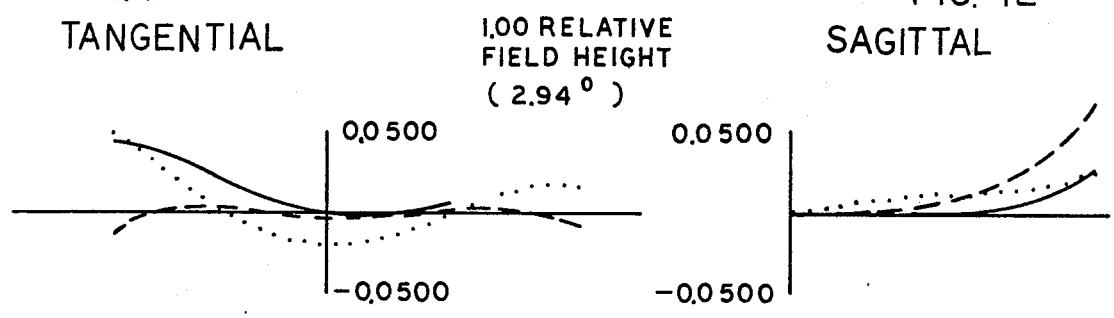
FIG.4A TANGENTIAL — 1.00 RELATIVE FIELD HEIGHT (2.94°) — FIG. 4E SAGITTAL
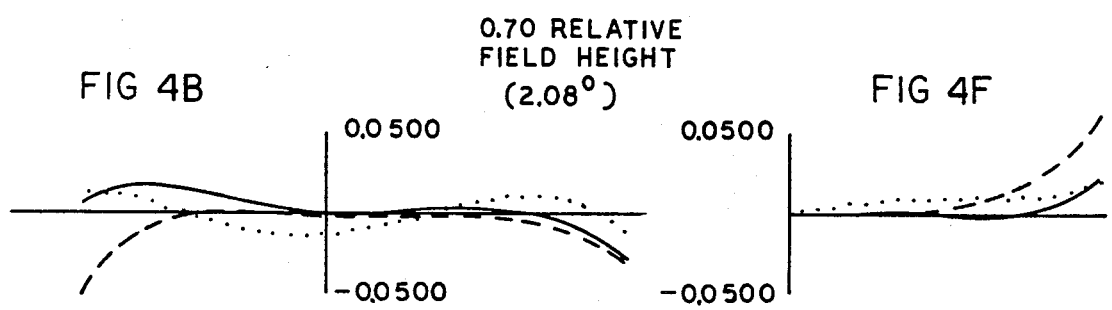
FIG 4B — 0.70 RELATIVE FIELD HEIGHT (2.08°) — FIG 4F
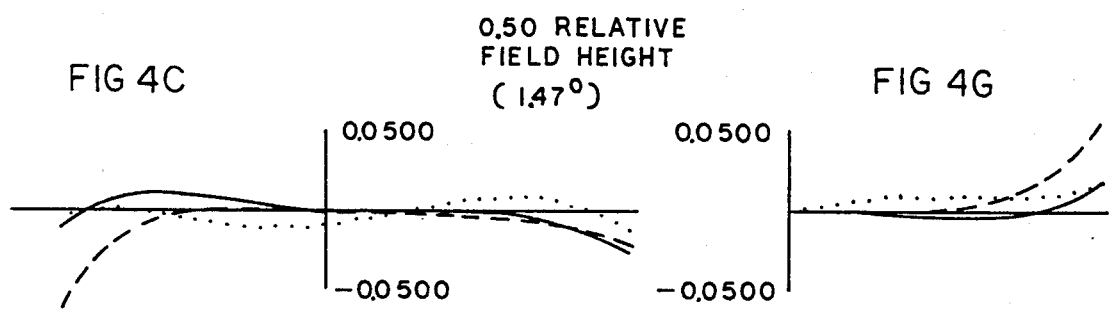
FIG 4C — 0.50 RELATIVE FIELD HEIGHT (1.47°) — FIG 4G
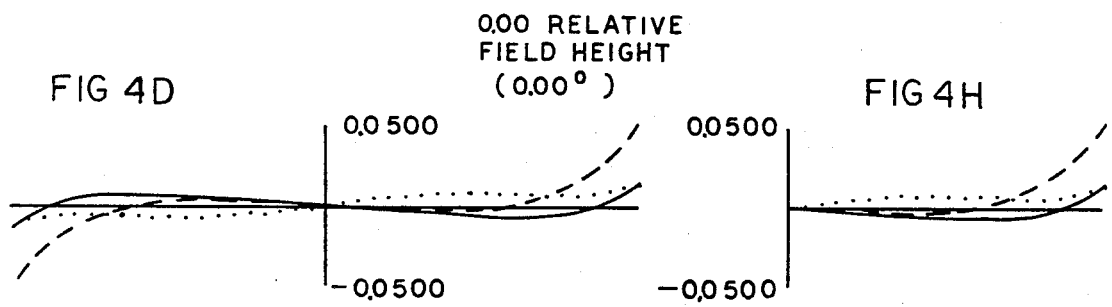
FIG 4D — 0.00 RELATIVE FIELD HEIGHT (0.00°) — FIG 4H FIG. 7A
TANGENTIAL
FIG. 7E
SAGITTAL
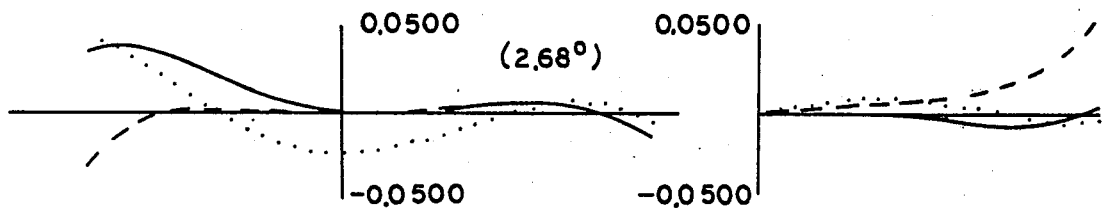
FIG. 7A (2.68°)
FIG. 7E
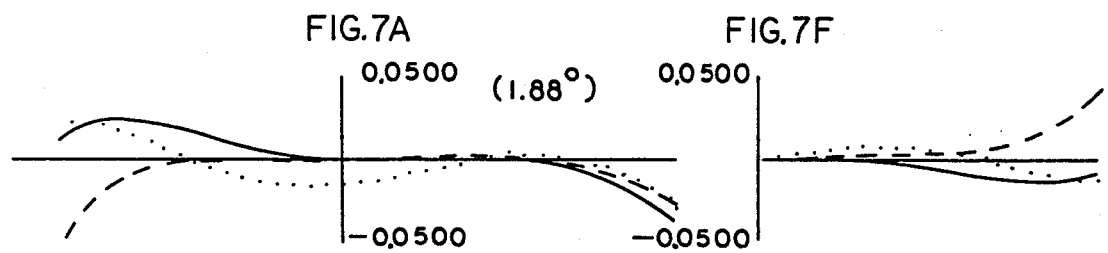
FIG. 7A (1.88°)
FIG. 7F
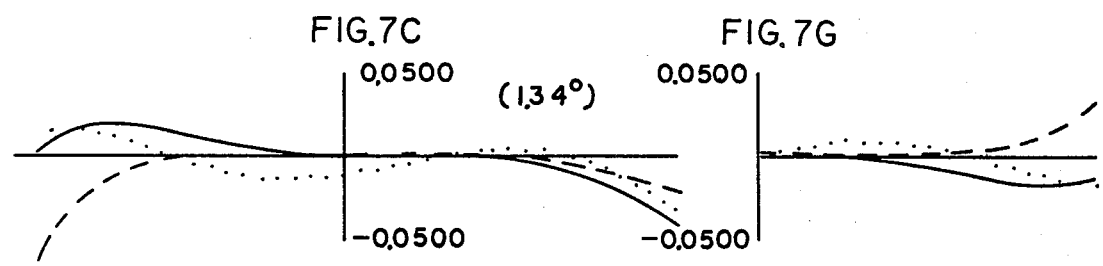
FIG. 7C (1.34°)
FIG. 7G
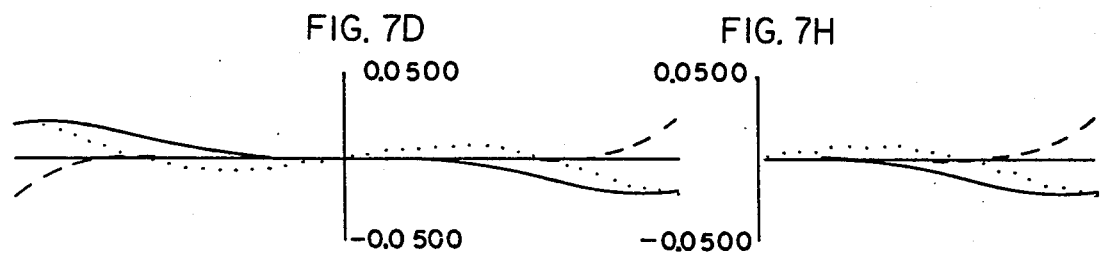
FIG. 7D
FIG. 7H

INTERNAL FOCUSING TELEPHOTO LENS

BACKGROUND OF THE INVENTION

This application is a continuation-in-part of Application Ser. No. 941,515 filed Sept. 11, 1978 now abandoned.

This invention relates to a telephoto lens for photographic devices. More particularly, this invention relates to a telephoto lens comprising four lens groups in which the focusing is provided by means of an internal lens group.

Telephoto lenses or lenses having relatively long focal lengths and relatively narrow fields of angular coverage are well known in the prior art. Some of the prior art telephoto lenses provide for internal focusing means. In general, prior art telephoto lenses employing an internal focusing means have proved unsatisfactory in terms of the weight and bulk of the lens. The difficulties of obtaining the satisfactory compactness have been exacerbated by the extent of the movement of the internal focusing components which is required in order to obtain the desired focusing range within the overall optical design parameters.

Other deficiencies in prior art telephoto lenses having internal focusing means have been experienced as a result of the necessity of providing an internal focusing means which has a relatively large refractive power. The relatively large power presents problems with respect to aberrational corrections of the lens as a whole, both as to monochromatic and chromatic aberrations. Hence, it has been previously necessary to employ relatively expensive glass materials to achieve desirable chromatic aberration correction.

The present invention provides a telephoto which requires substantially less axial movement of an internal focusing group and therefore facilitates the compactness of the lens as a whole. Favorable chromatic aberration correction is achieved without the use of crystalline or expensive glass materials. The latter high degree of aberrational correction is provided in a telephoto lens having a relatively low telephoto ratio and a relatively short focusing motion. Of further significance, is the feature of the present lens form which provides for a lens that can be focused continuously from infinity to a near point at which the image size is greater than 1/7 that of the object. The latter therefore permits convenient close-up photography in situations where it is essential that the photographic system be relatively remote from the object. Moreover, such characteristics are achieved without significant loss of image quality.

SUMMARY OF THE INVENTION

The telephoto lens comprises four groups of positive, negative, positive and negative powers, respectively, from the front end to the rear end. The first group comprises a singlet and a doublet and the second group comprises a doublet. The first, third and fourth groups are stationary. The second group is axially movable for focusing.

An object of the present invention is to provide a new and improved telephoto lens having provision for internal focusing which requires a relatively short focusing motion.

An object of the invention is to provide a new and improved telephoto lens which achieves a high degree of aberrational correction without the use of crystalline or other expensive glasses.

A further object of the invention is to provide a new and improved telephoto lens which is compact and relatively lightweight.

Other objects and advantages of the invention will become apparent from the detailed description taken in conjunction with the accompanying drawings.

BRIEF DESCRIPTION OF THE DRAWINGS

FIGS. 4a–4h and 7a–7h are graphical representations of the various aberrations of the lens system shown in FIGS. 1–3, when focused respectively at infinity and at a magnification of 1:7;

DETAILED DESCRIPTION

Figure 1:
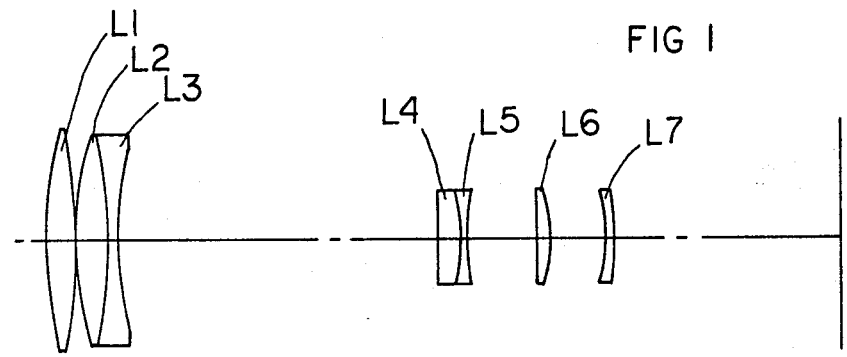
FIG. 1 is a diagrammatic sectional view of an optical system embodying the present invention, with the focusing group being shown in a position for close focusing.
Figure 2:
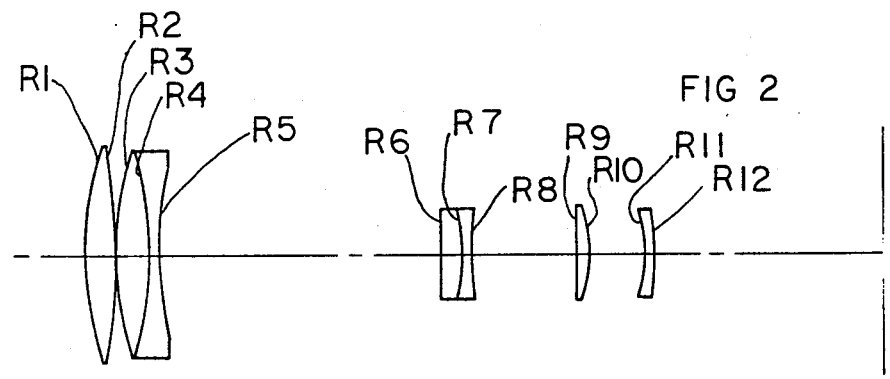
FIG. 2 is a diagrammatic sectional view of the optical system with the focusing group being positioned for a mid-range focus.
Figure 3:
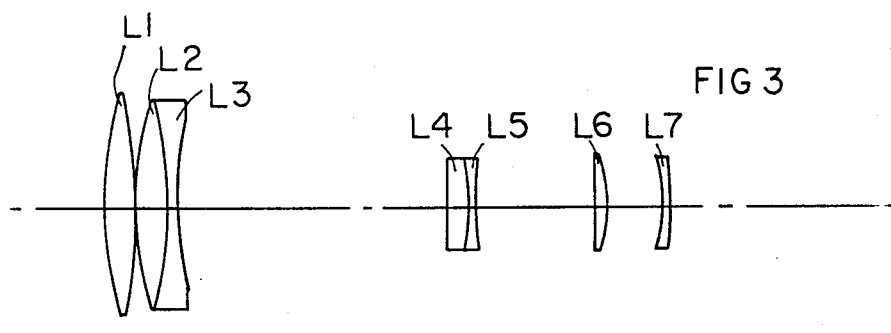
FIG. 3 is a diagrammatic sectional view of the optical system with the focusing group being arranged for focus at infinity.

The telephoto lens as shown in FIGS. 1–3 comprises seven lens elements arranged in four groups. The object end is at the left of the figures. The image plane at the right of the figures is illustrated by a vertical line. The object and image ends are hereafter designated the front and rear ends, respectively.

The lens elements are indicated by the letter L followed by a numeral indicating numerically the lens element position from the front end to the rear end, respectively. The corresponding surfaces of the lens elements are indicated by the letter R followed by a numeral indicating the lens surface number from the front end to the rear end, respectively. The optical axis is shown with a partially broken line to indicate that the distances along the optical axis are not drawn in exact proportions.

The first group comprises three elements, L1, L2, and L3. Lenses L1 and L2 are each biconvex lenses of positive power. Lens L3 is a negative element. Lenses L2 and L3 form a doublet. The overall power of the first group is positive.

The second group comprises a doublet consisting of lenses L4 and L5. Lens L4 may be either plano-convex, concavo-convex or bi-convex and is of positive power. Lens L5 is a biconcave element of negative power.

The third group is comprised of lens L6 which is a meniscus lens of positive power.

The fourth group comprises a lens L7 which is a concavo-convex element of negative power.

The first, third and fourth groups are stationary or in fixed relation. The second group comprising lenses L4 and L5 is axially movable with respect to the image plane for focusing. The extent of movement that is required is relatively small and because the second group movement is confined between the stationary first and third groups, the overall length of the telephoto lens is maintained at a constant length, irregardless of the relative focus position of the lens.

One of the problems in obtaining a suitable optical design for a telephoto lens is that in reducing the telephoto ratio of the lens, secondary chromatic aberrations become more difficult to correct. This invention however, discloses a telephoto lens which has not only a relatively low telephoto ratio, but a high degree of aberrational correction. The latter characteristics have been accomplished in part by the selection of glasses in the design of the lens which conform to various parameters of glass Q-values as will be hereinafter defined and described.

Glass Q-values are defined and described in a paper by J. Hoogland entitled "The Design of Apochromatic Lenses" in *Recent Advances in Lens Design,* Perkin-Elmer. Q may be defined in terms of Q' which in turn is defined as follows.

$$Q' = Y - Y_n$$

Where:

$$Y = n_f - n_e/n_e - 1$$

Where $n_f$ $n_e$ and $n_{c'}$ are the refractive indices at the 480.0 nm wave length, the 546.1 nm wave length, and the 643.8 nm wave lengths respectively.

$$Y_n = aX + b$$

X is given by: $X = n_f - n_{c'}/n_e - 1$

The constants a and b are obtained from a straight line plot of partial dispersion P versus Abbe number V for the Schott glasses SK16 and SF2. From this plot, a and b are determined to be:

$$a = 0.542422 \text{ and } b = 0.000553.$$

For any glass, Q' is thus expressed:

$$Q' = \frac{n_f - n_e}{n_e - 1} - 0.542422 \frac{n_f - n_{c'}}{n_e - 1} + 0.000553$$

$$Q = Q' \times 10^6$$

The design of a telephoto lens having low chromatic aberration can be accomplished by the use of ordinary non-crystalline glass materials by the appropriate selection of glasses having certain Q value characteristics. As a general consideration, the stronger, i.e. the larger the power of a given element or lens, the more advantageous an appropriate choice of glass Q value. Glasses having high positive Q values are selected for elements of positive power and glasses with large negative Q values are selected for elements of negative power. Specific design parameters which are applicable to the present invention are described later in this specification.

Five specific examples of the telephoto lens are set forth in Tables I–V below.

In Tables I–V below, the first column lists the lens elements numbered from the front to the rear end of the lens. The second column lists the radii of curvature in millimeters for the respective surfaces of the elements designated by R and numbered from the front to the rear with positive values of the radii indicating surfaces which are convex to the front end and negative values of the radii indicating surfaces which are concave to the front end. The third column lists the axial distances between surfaces in millimeters. The fourth column lists the refractive index $N_d$ of the elements and the fifth column lists the dispersive index $V_D$ of the Abbe number of the element.

TABLE I

| Element | Radius of Curvature (mm) | Axial Distance Between Surfaces (mm) | Index of Refraction $N_D$ | Abbe No. $V_D$ |
|---|---|---|---|---|
| R1 = | 129.059 | | | |
| L1 | | 9.31 | 1.51823 | 58.96 |
| R2 = | −208.333 | | | |
| | | 0.30 | | |
| R3 = | 108.584 | | | |
| L2 | | 10.37 | 1.51823 | 58.96 |
| R4 = | −140.226 | | | |
| L3 | | 4.00 | 1.74950 | 35.04 |
| R5 = | 159.606 | | | |
| | | 86.18 | | |
| R6 = | Plano | | | |
| L4 | | 7.00 | 1.78472 | 25.70 |
| R7 = | −65.463 | | | |
| L5 | | 2.50 | 1.83500 | 42.98 |
| R8 = | 105.958 | | | |
| | | 37.49 | | |
| R9 = | −471.233 | | | |
| L6 | | 4.04 | 1.51742 | 52.15 |
| R10 = | −47.239 | | | |
| | | 18.36 | | |
| R11 = | −36.628 | | | |
| L7 | | 2.50 | 1.77250 | 49.62 |
| R12 = | −94.946 | | | |

TABLE II

| Element | Radius of Curvature (mm) | Axial Distance Between Surfaces (mm) | Index of Refraction $N_D$ | Abbe No. $V_D$ |
|---|---|---|---|---|
| R1 = | 127.620 | | | |
| L1 | | 9.33 | 1.518.23 | 58.96 |
| R2 = | −210.793 | | | |
| | | 0.30 | | |
| R3 = | 106.588 | | | |
| L2 | | 10.40 | 1.518.23 | 58.96 |
| R4 = | −142.093 | | | |
| L3 | | 4.00 | 1.74950 | 35.04 |
| R5 = | 153.781 | | | |
| | | 87.25 | | |
| R6 = | −568.303 | | | |
| L4 | | 5.22 | 1.84666 | 23.83 |
| R7 = | −83.591 | | | |
| L5 | | 2.50 | 1.80420 | 46.50 |
| R8 = | 114.412 | | | |
| | | 37.84 | | |
| R9 = | −302.198 | | | |
| L6 | | 3.94 | 1.51742 | 52.15 |
| R10 = | −46.050 | | | |
| | | 16.04 | | |
| R11 = | −36.198 | | | |
| L7 | | 2.50 | 1.77250 | 49.62 |
| R12 = | −88.159 | | | |

TABLE III

| Element | Radius of Curvature (mm) | Axial Distance Between Surfaces (mm) | Index of Refraction $N_D$ | Abbe No. $V_D$ |
|---|---|---|---|---|
| R1 = | 125.105 | | | |
| L1 | | 9.33 | 1.5182 | 58.96 |
| R2 = | −218.174 | | | |
| | | 0.30 | | |
| R3 = | 98.207 | | | |
| L2 | | 10.50 | 1.5182 | 58.96 |
| R4 = | −154.827 | | | |
| L3 | | 4.00 | 1.7495 | 35.04 |
| R5 = | 137.286 | | | |
| | | 101.63 | | |
| R6 = | 1817.923 | | | |
| L4 | | 3.21 | 1.84666 | 23.83 |

TABLE III-continued

| Element | Radius of Curvature (mm) | Axial Distance Between Surfaces (mm) | Index of Refraction $N_D$ | Abbe No. $V_D$ |
|---|---|---|---|---|
| R7 = | −59.743 | | | |
| L5 | | 2.50 | 1.83500 | 42.98 |
| R8 = | 70.097 | | | |
| | | 37.56 | | |
| R9 = | −1307.707 | | | |
| L6 | | 4.87 | 1.51742 | 52.10 |
| R10 = | −39.278 | | | |
| | | 9.00 | | |
| R11 = | −33.497 | | | |
| L7 | | 2.50 | 1.83500 | 42.98 |
| R12 = | −77.679 | | | |

TABLE IV

| Element | Radius of Curvature (mm) | Axial Distance Between Surfaces (mm) | Index of Refraction $N_D$ | Abbe No. $V_D$ |
|---|---|---|---|---|
| R1 = | 130.095 | | | |
| L1 | | 9.29 | 1.5182 | 58.96 |
| R2 = | −206.993 | | | |
| | | 0.30 | | |
| R3 = | 103.224 | | | |
| L2 | | 10.48 | 1.5182 | 58.96 |
| R4 = | −144.685 | | | |
| L3 | | 4.00 | 2.7495 | 35.04 |
| R5 = | 152.525 | | | |
| | | 80.70 | | |
| R6 = | −756.922 | | | |
| L4 | | 12.00 | 1.84666 | 23.83 |
| R7 = | −87.747 | | | |
| L5 | | 2.50 | 1.80420 | 46.50 |
| R8 = | 110.923 | | | |
| | | 37.61 | | |
| R9 = | −274.269 | | | |
| L6 | | 3.90 | 1.51742 | 52.10 |
| R10 = | −44.799 | | | |
| | | 15.33 | | |
| R11 = | −35.219 | | | |
| L7 | | 2.50 | 1.77250 | 49.62 |
| R12 = | −90.351 | | | |

TABLE V

| Element | Radius of Curvature (mm) | Axial Distance Between Surfaces (mm) | Index of Refraction $N_D$ | Abbe No. $V_D$ |
|---|---|---|---|---|
| R1 = | 147.960 | | | |
| L1 | | 9.78 | 1.57250 | 57.49 |
| R2 = | −280.940 | | | |
| | | 0.30 | | |
| R3 = | 100.840 | | | |
| L2 | | 10.07 | 1.57250 | 57.49 |
| R4 = | −176.771 | | | |
| L3 | | 4.00 | 1.74950 | 35.04 |
| R5 = | 129.663 | | | |
| | | 93.09 | | |
| R6 = | Plano | | | |
| L4 | | 10.45 | 1.78472 | 25.70 |
| R7 = | −85.845 | | | |
| L5 | | 2.50 | 1.77250 | 49.62 |
| R8 = | 78.526 | | | |
| | | 37.69 | | |
| R9 = | −269.503 | | | |
| L6 | | 4.63 | 1.51742 | 52.10 |
| R10 = | −35.947 | | | |
| | | 6.31 | | |
| R11 = | −32.224 | | | |
| L7 | | 2.50 | 1.66672 | 48.30 |
| R12 = | −81.672 | | | |

The choice of Q value in the examples substantially defined by the preceding tables is most critical for elements L1 through L5. Table VI below lists the Q values of elements L1 through L5 for the examples of Tables I-V.

TABLE VI

| | Q - VALUES | | | | |
|---|---|---|---|---|---|
| | L1 | L2 | L3 | L4 | L5 |
| Table I | 18 | 18 | −56 | 89 | −70 |
| Table II | 18 | 18 | −56 | 88 | −67 |
| Table III | 18 | 18 | −56 | 88 | −70 |
| Table IV | 18 | 18 | −56 | 88 | −67 |
| Table V | 20 | 20 | −56 | 89 | −55 |

From the foregoing Table VI, the following relationships are obtained:

$Q_1$ is greater than 15
$Q_2$ is greater than 15
$Q_3$ is less than −50
$Q_4$ is greater than 80
$Q_5$ is less than −50

Where $Q_1$, $Q_2$, $Q_3$, $Q_4$ and $Q_5$ are the glass Q-values of elements L1 through L5 respectively.

It can be seen that the invention and the appropriate selection of elements within given glass Q-value parameters as set forth above results in an internal focusing telephoto lens having a high degree of chromatic aberration correction and a high degree of image quality as illustrated in FIGS. 5a, 5b, 6a, 6b, 4a–4h, and 7a–7h.

Figure 5A:
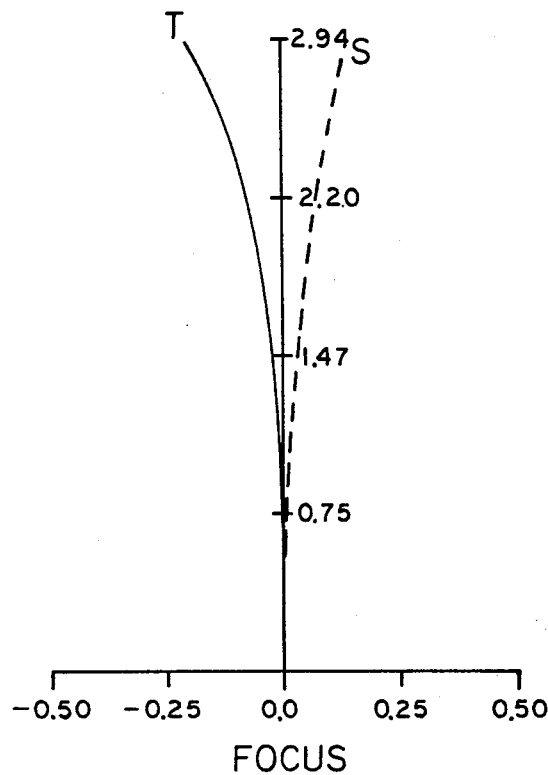
FIGS. 5a and 6a are graphical representations of the astigmatic field curve for the optical system as shown in FIGS. 1–3 when focused at infinity and at a magnification of 1:7.
Figure 6A:
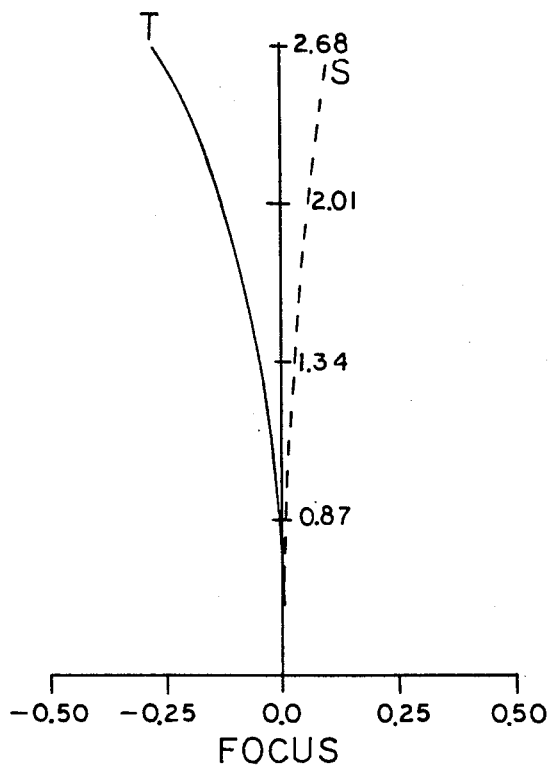

FIGS. 5a and 6a represent astigmatic field curves for transverse tangential (T) and sagittal (S) field curvature, respectively, as shown in solid and dotted lines when the telephoto lens set forth in Table I is focused at infinity and at the maximum close focus condition of 1:7 magnification.

Figure 5B:
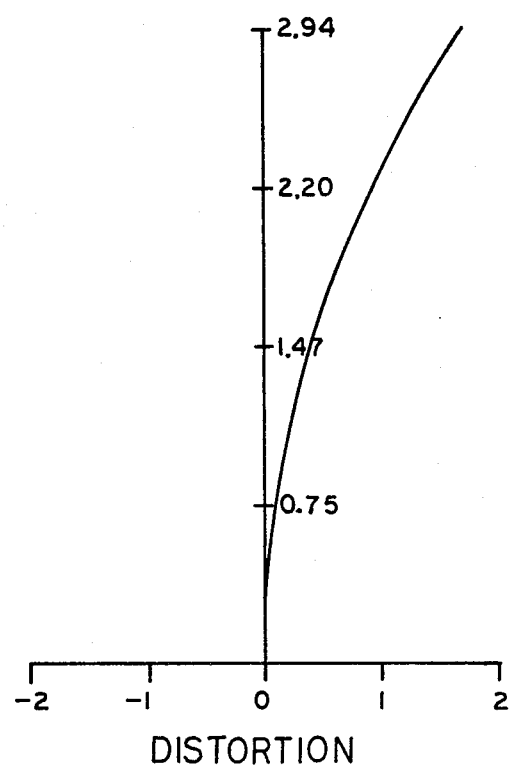
FIGS. 5b and 6b are graphical representations of the distortion of the lens plotted as a percentage deviation from a "perfect" image when the lens is focused at infinity and at a magnification of 1:7.
Figure 6B:
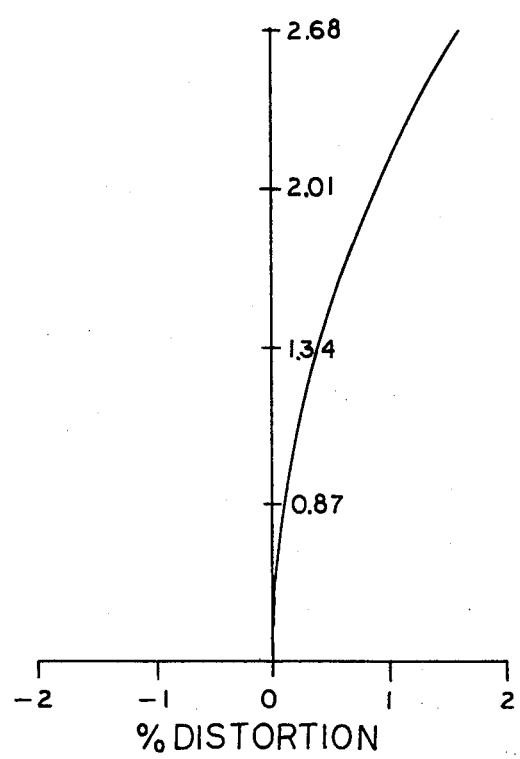

FIGS. 5b and 6b represent the distortion of the telephoto lens set forth in Table I plotted as a percentage deviation from a "perfect" image, focused at infinity and at the maximum close focus condition of 1:7 magnification.

FIGS. 4a–4h and 7a–7h graphically represent various transverse ray aberrations of the telephoto lens illustrated in FIGS. 1-3 and set forth in Table I when focused respectively at infinity and at a magnification of 1:7. The dashed line curve represents the axial ray bundle for 480.0 nm wave lengths, the solid line is for 546.1 nm wave length, and the dotted line is for 643.8 nm wave length.

As shown by the various examples, various lens forms may be made within the scope of this invention. Accordingly the appended claims are intended to cover all modifications of the disclosed embodiments as well as other embodiments thereof which do not depart from the spirit and scope of this invention.

I claim:

1. A telephoto lens of fixed equivalent focal length comprising from the front end to the rear end:
   a first positive group;
   a second negative group comprising a doublet including a positive element and a biconcave element; and
   a third positive group and a fourth negative group;
   said first, third, and fourth groups being stationary in said lens;
   said second group being axially movable for focusing of said lens.

2. The telephoto lens of claim 1 wherein said third and fourth groups each comprise a single element.

3. The telephoto lens of claim 1 wherein said first group comprises a biconvex element and a doublet including a biconvex element.

4. The telephoto lens of claim 3 wherein said negative elements of said first and second groups have Q-values less than negative 50.

5. The telephoto lens of claim 3 wherein said biconvex elements of said first group have Q-values greater than 15.

6. The telephoto lens of claim 1 wherein said positive element of said second group has a Q-value greater than 80.

7. The telephoto lens of claim 1 defined by substantially the following specification:

| Element | Radius of Curvature (mm) | Axial Distance Between Surfaces (mm) | Index of Refraction $N_D$ | Abbe No. $V_D$ |
|---|---|---|---|---|
| R1 = | 129.059 | | | |
| L1 | | 9.31 | 1.51823 | 58.96 |
| R2 = | −208.333 | | | |
| | | 0.30 | | |
| R3 = | 108.584 | | | |
| L2 | | 10.37 | 1.51823 | 58.96 |
| R4 = | −140.226 | | | |
| L3 | | 4.00 | 1.74950 | 35.04 |
| R5 = | 159.606 | | | |
| | | 86.18 | | |
| R6 = | Plano | | | |
| L4 | | 7.00 | 1.78472 | 25.70 |
| R7 = | −65.463 | | | |
| L5 | | 2.50 | 1.83500 | 42.98 |
| R8 = | 105.958 | | | |
| | | 37.49 | | |
| R9 = | −471.233 | | | |
| L6 | | 4.04 | 1.51742 | 52.15 |
| R10 = | −47.239 | | | |
| | | 18.36 | | |
| R11 = | −36.628 | | | |
| L7 | | 2.50 | 1.77250 | 49.62 |
| R12 = | −94.946 | | | | where the first column lists the lens elements numerically commencing at the front end of the lens, the second column lists the radii of curvature in millimeters for the respective surfaces of the elements numbered from the front to the rear with positive values of the radii indicating surfaces which are convex to the front and negative values radii which are concave to the front, the third column lists the axial distances between surfaces in millimeters, the fourth column lists the refractive index $N_D$ of the elements and the fifth column lists the dispersive index $V_D$ of the Abbe number of the element.

8. The telephoto lens of claim 1 defined by substantially the following specification:

| Element | Radius of Curvature (mm) | Axial Distance Between Surfaces (mm) | Index of Refraction $N_D$ | Abbe No. $V_D$ |
|---|---|---|---|---|
| R1 = | 127.620 | | | |
| L1 | | 9.33 | 1.518.23 | 58.96 |
| R2 = | −210.793 | | | |
| | | 0.30 | | |
| R3 = | 106.588 | | | |
| L2 | | 10.40 | 1.518.23 | 58.96 |
| R4 = | −142.093 | | | |
| L3 | | 4.00 | 1.74950 | 35.04 |
| R5 = | 153.781 | | | |
| | | 87.25 | | |
| R6 = | −568.303 | | | |
| L4 | | 5.22 | 1.84666 | 23.83 |
| R7 = | −83.591 | | | |
| L5 | | 2.50 | 1.80420 | 46.50 |
| R8 = | 114.412 | | | |
| | | 37.84 | | |
| R9 = | −302.198 | | | |
| L6 | | 3.94 | 1.51742 | 52.15 |
| R10 = | −46.050 | | | |
| | | 16.04 | | |
| R11 = | −36.198 | | | |
| L7 | | 2.50 | 1.77250 | 49.62 |
| R12 = | −88.159 | | | | where the first column lists the lens elements numerically commencing at the front end of the lens, the second column lists the radii of curvature in millimeters for the respective surfaces of the elements numbered from the front to the rear with positive values of the radii indicating surfaces which are convex to the front and negative values radii which are concave to the front, the third column lists the axial distances between surfaces in millimeters, the fourth column lists the refractive index $N_D$ of the elements and the fifth column lists the dispersive index $V_D$ of the Abbe number of the element.

9. The telephoto lens of claim 1 defined by substantially the following specification:

| Element | Radius of Curvature (mm) | Axial Distance Between Surfaces (mm) | Index of Refraction $N_D$ | Abbe No. $V_D$ |
|---|---|---|---|---|
| R1 = | 125.105 | | | |
| L1 | | 9.33 | 1.5182 | 58.96 |
| R2 = | −218.174 | | | |
| | | 0.30 | | |
| R3 = | 98.207 | | | |
| L2 | | 10.50 | 1.5182 | 58.96 |
| R4 = | −154.827 | | | |
| L3 | | 4.00 | 1.7495 | 35.04 |
| R5 = | 137.286 | | | |
| | | 101.63 | | |
| R6 = | 1817.923 | | | |
| L4 | | 3.21 | 1.84666 | 23.83 |
| R7 = | −59.743 | | | |
| L5 | | 2.50 | 1.83500 | 42.98 |
| R8 = | 70.097 | | | |
| | | 37.56 | | |
| R9 = | −1307.707 | | | |
| L6 | | 4.87 | 1.51742 | 52.10 |
| R10 = | −39.278 | | | |
| | | 9.00 | | |
| R11 = | −33.497 | | | |
| L7 | | 2.50 | 1.83500 | 42.98 |
| R12 = | −77.679 | | | | where the first column lists the lens elements numerically commencing at the front end of the lens, the second column lists the radii of curvature in millimeters for the respective surfaces of the elements numbered from the front to the rear with positive values of radii indicating surfaces which are convex to the front and negative values radii which are concave to the front, the third column lists the axial distances between surfaces in millimeters, the fourth column lists the refractive index $N_D$ of the elements and the fifth column lists the dispersive index $V_D$ of the Abbe number of the element.

10. The telephoto lens of claim 1 defined by substantially the following specification:

| Element | Radius of Curvature (mm) | Axial Distance Between Surfaces (mm) | Index of Refraction $N_D$ | Abbe No. $V_D$ |
|---|---|---|---|---|
| R1 = | 130.095 | | | |
| L1 | | 9.29 | 1.5182 | 58.96 |
| R2 = | −206.993 | | | |
| | | 0.30 | | |
| R3 = | 103.224 | | | |
| L2 | | 10.48 | 1.5182 | 58.96 |
| R4 = | −144.685 | | | |
| L3 | | 4.00 | 1.7495 | 35.04 |
| R5 = | 152.525 | | | |
| | | 80.70 | | |
| R6 = | −756.922 | | | |
| L4 | | 12.00 | 1.84666 | 23.83 |
| R7 = | −87.747 | | | |
| L5 | | 2.50 | 1.80420 | 46.50 |
| R8 = | 110.923 | | | |
| | | 37.61 | | |
| R9 = | −274.269 | | | |
| L6 | | 3.90 | 1.51742 | 52.10 |
| R10 = | −44.799 | | | |
| | | 15.33 | | |
| R11 = | −35.219 | | | |
| L7 | | 2.50 | 1.77250 | 49.62 |
| R12 = | −90.351 | | | | where the first column lists the lens elements numerically commencing at the front end of the lens, the second column lists the radii of curvature in millimeters for the respective surfaces of the elements numbered from the front to the rear with positive values of the radii indicating surfaces which are convex to the front and negative values radii which are concave to the front, the third column lists the axial distances between surfaces in millimeters, the fourth column lists the refractive index $N_D$ of the elements and the fifth column lists the dispersive index $V_D$ of the Abbe number of the element.

11. The telephoto lens of claim 1 defined by substantially the following specification:

| Element | Radius of Curvature (mm) | Axial Distance Between Surfaces (mm) | Index of Refraction $N_D$ | Abbe No. $V_D$ |
|---|---|---|---|---|
| R1 = | 147.960 | | | |
| L1 | | 9.78 | 1.57250 | 57.49 |
| R2 = | −280.940 | | | |
| | | 0.30 | | |
| R3 = | 100.840 | | | |
| L2 | | 10.07 | 1.57250 | 57.49 |
| R4 = | −176.771 | | | |
| L3 | | 4.00 | 1.74950 | 35.04 |
| R5 = | 129.663 | | | |
| | | 93.09 | | |
| R6 = | Plano | | | |
| L4 | | 10.45 | 1.78472 | 25.70 |
| R7 = | −85.845 | | | |
| L5 | | 2.50 | 1.77250 | 49.62 |
| R8 = | 78.526 | | | |
| | | 37.69 | | |
| R9 = | −269.503 | | | |
| L6 | | 4.63 | 1.51742 | 52.10 |
| R10 = | −35.947 | | | |
| | | 6.31 | | |
| R11 = | −32.224 | | | |
| L7 | | 2.50 | 1.66672 | 48.30 |
| R12 = | −81.672 | | | | where the first column lists the lens elements numerically commencing at the front end of the lens, the second column lists the radii of curvature in millimeters for the respective surfaces of the elements numbered from the front to the rear with positive values of the radii indicating surfaces which are convex to the front and negative values radii which are concave to the front, the third column lists the axial distances between surfaces in millimeters, the fourth column lists the refractive index $N_D$ of the elements and the fifth column lists the dispersive index $V_D$ of the Abbe number of the element.

* * * * *

UNITED STATES PATENT AND TRADEMARK OFFICE
CERTIFICATE OF CORRECTION

PATENT NO. : 4,359,272
DATED : November 16, 1982
INVENTOR(S) : Melvyn H. Kreitzer It is certified that error appears in the above-identified patent and that said Letters Patent is hereby corrected as shown below:

On the title page, Assignee should read

-- Vivitar Corporation, Santa Monica, Calif. --.

Signed and Sealed this

Fifteenth Day of March 1983

[SEAL]

Attest:

GERALD J. MOSSINGHOFF

Attesting Officer       Commissioner of Patents and Trademarks